Patented July 14, 1936

2,047,245

UNITED STATES PATENT OFFICE 2,047,245

POLYMERIZATION OF RESINS

George Kenneth Anderson, Pittsburgh, Pa., assignor to The Neville Company, a corporation of Pennsylvania No Drawing. Application August 3, 1934,
Serial No. 738,300

2 Claims. (Cl. 260—7)

This invention relates to the production of coumarone-indene resin, hereinafter termed, as in commerce, merely "coumarone" resin, by the catalytic polymerization of resin-forming bodies contained in crude solvent naphtha, and other hydrocarbon liquids, containing bodies polymerizable to form resins of the coumarone type.

In a catalytic polymerization process, such as a process by which coumarone resin is produced by the polymerization of resin-forming bodies in crude solvent naphtha, or its equivalent, sulphuric acid is the most satisfactory catalyst, and the catalyst most generally employed. Concentrated sulphuric acid, i. e. 66° Baumé sulphuric acid, is in some respects the ideal catalyst for use in such polymerizing process.

There are, however, certain problems attendant upon the use of concentrated sulphuric acid, and these problems have been solved more or less satisfactorily by various methods of procedure. It is well known that in the polymerizing reaction which produces coumarone resin, utilizing sulphuric acid as a catalyst, there is a tendency for the reaction temperature to rise rapidly in a surge, which produces a relatively great proportion of sludge, and which also tends to produce resin lacking in adequate solubility. Although the rapid rise of reaction temperature may be tempered in various ways, there is present during polymerization, a tendency toward intense local action in the reactive material, with attendant side reactions and the production of unduly high polymers, and undesirable products of reaction. This effect also results in degree, in the production of resins of inadequate solubility, and increases the difficulty of purification and recovery.

I have found that one satisfactory method of tempering the polymerizing action of sulphuric acid in the formation of resins, and of controlling the reaction by which polymerization proceeds in the polymerizable content of crude solvent naphtha, and the like, is to dilute concentrated sulphuric acid, employed as a catalyst, by means of a suitable organic solvent diluent.

For use as a diluent for sulphuric acid in, for example, the production of coumarone resin by polymerization, it is essential that the diluent be a solvent for the sulphuric acid, and that it should neither react with the inert constituents of the reaction mixture, nor produce of itself side reactions in the bodies available for polymerization. It is also necessary that the diluent should either be non-reactive with the sulphuric acid, or that such reaction as may occur does not substantially impair the activity of the sulphuric acid as a catalyst.

I have found at least a few members of the group of monobasic aliphatic acids suitable for my purpose. These are formic acid, propionic acid, and acetic acid. Some members of the group, because of their physical condition resulting from the weight of their molecular structure, may be undesirable for use as a sulphuric acid diluent, as being solids at normal room temperature. Because of its low cost and availability, I have found glacial acetic acid ($CH_3COOH$) particularly suitable as a diluent. It may be noted that acetic acid, as well as the other aliphatic acids which have been mentioned, is saturated in respect to its carbon-to-carbon linkages. It does not tend to form addition products with the sulphuric acid when the acetic and sulphuric acids are commingled.

I have made experiments under various conditions, utilizing acetic acid as a diluent for 66° Baumé sulphuric acid. In each of such experiments I have commingled the sulphuric acid and the acetic acid, to produce a dilute body of catalyst, prior to commingling the catalyst with the reactive liquid. I have found that the polymerizing reaction is affected both by the concentration of the sulphuric acid in the catalytic mixture, and by the concentration of polymerizable bodies in the reactive material, such as crude solvent naphtha as it is prepared for polymerization. Examples of polymerization with dilution of the catalyst may be cited.

*Example No. 1*

In one exemplary polymerization I used a crude solvent naphtha having a polymerizable content of 67.2%. To this I added a dilute catalyst comprising 20% 66° Baumé sulphuric acid and 80% glacial acetic acid. This was added in such volume that the volume of sulphuric acid, considered alone, equalled .95% the volume of the crude solvent naphtha.

The initial temperature of the crude solvent naphtha was 17° C., and during the reaction period of about one-half hour, the temperature of the mixture rose to 28° C.

The reaction mixture was a light brown color, lacking the characteristic intense red color characteristic of the sulphuric acid reaction. I dissolved the reacted mixture in three times its volume of petroleum benzine. After standing several minutes there was observable a curdy precipitate of light brown color, which rapidly coagulated and settled to the bottom of the treating vessel. The blend containing the produced resins in solution was a yellowish-orange in color, and readily separable from the precipitate which lacked the typical red sulphuric acid coloration.

After water washing and neutralization I recovered the resin content of the blend. This resin was of a light amber color. The melting point of this resin was 108° C., and it was found to be highly soluble, having a precipitation from Stoddard solvent naphtha below 0° C.

*Example No. 2*

In this other run I utilized crude solvent naphtha having a total polymerizable content of 50%, and added in bulk to this initial material a mixture of sulphuric acid and acetic acid diluent, having the proportion of 60% acetic acid to 30% sulphuric acid. The volume of sulphuric acid, which was 66° Baumé acid, considered alone, was equal to 1% the volume of the crude solvent naphtha. The initial temperature of the crude solvent naphtha was 21° C., and during a reaction period of two hours the temperature rose to 37° C.

The reacted material from this polymerizing reaction showed the same color and underwent the same precipitation as described in the example above, upon dissolving it in the petroleum benzine.

The resin recovered from this resinous solution was also light amber in color. It was also found to be of very high solubility, as no precipitation from Stoddard solvent naphtha was observable at temperatures carried substantially below 0° C.

While the procedure outlined in the examples given is my preferred procedure when using an organic solvent diluent for a sulphuric acid catalyst, such diluted catalyst may be employed in accordance with a polymerization process otherwise conducted. For example, petroleum benzine, or if desired a refined solvent naphtha, may be added to the reaction mixture either before, or during, the process of polymerization. Also, sulphuric acid diluted with a suitable organic solvent may be used in preparing an activated bath of catalyst and an inert hydrocarbon liquid, in accordance with the procedure of my co-pending application Serial No. 679,085, filed July 5, 1933, issued as Patent No. 1,990,215.

The examples of organic acids given above as suitable diluents for the sulphuric acid all possess the advantage that they do not adversely affect the efficiency of the sulphuric acid itself. It is, of course, true that not all of the monobasic aliphatic acids have physical characteristics rendering their use desirable as a diluent for sulphuric acid in a polymerization process for the production of resins. They have, however, in common the quality that they do not present any strong tendency to react with the polymerizable bodies of crude solvent naphtha and the like, or with either the refined or partially refined naphtha, or the petroleum benzine, which are, or may be, present in the reaction mixture. They are, therefore, capable of tempering the action of the sulphuric acid without in themselves causing side reactions, or creating undesirable conditions at any stage of the process.

Considering broadly the use of an organic diluent which is suitable for the dilution of sulphuric acid in a catalytic polymerization process resulting in the production of resin, I may consider generally suitable such organic liquids as are inert to the reactive material, and which, while tempering the action of the sulphuric acid by dilution, do not specifically detract from the efficiency of the acid to promote the progress of polymerization. The advantage which one diluent having such qualities may possess over another such diluent is one of specifically improved performance.

In addition to the use of the above-mentioned organic acids as diluents for the sulphuric acid catalyst, I have also found that isopropyl ether is a desirable diluent. This material conforms to the requirements which have been explained above.

In some respects the results obtained from the use of isopropyl ether as a diluent for the sulphuric acid differ from the results obtained by the use of acetic acid as the diluent. It has been my experience that under identical conditions a dilute catalyst, in which isopropyl ether is the diluent, tends, under identical conditions, to produce a coumarone resin having a higher melting point than that produced by a catalyst comprising sulphuric acid in a state of dilution in acetic acid, or its homologue.

An example of a polymerization process using isopropyl ether as a diluent for sulphuric acid may be cited as follows:

*Example No. 3*

Taking crude solvent naphtha containing 50% of polymerizable bodies, I added to it a catalyst comprising 66° Baumé sulphuric acid and isopropyl ether, in the proportion of 1 part by volume of the sulphuric acid to 4 volumes of ether. The initial temperature of the crude solvent naphtha was 17° C. and the catalyst was added in bulk. During a reaction period of 8 minutes the temperature rose to a maximum of 28° C. The proportion of sulphuric acid considered alone to the total volume of crude solvent naphtha was 1%. I found the melting point of the resin recovered from this polymerizing reaction to be 121° C. and that the resin precipitates from Stoddard solvent naphtha at 7° C. The color of the resin was dark amber.

*Example No. 4*

As another typical example as a use of isopropyl ether as a diluent, I conducted polymerization in which the same proportion of sulphuric acid to isopropyl ether were used, and in which I used the same proportion of sulphuric acid to crude solvent naphtha. The crude solvent naphtha constituting the reaction material, however, contained 67.2% of polymerizable bodies. The initial temperature of the reactive material was 17° C., and the maximum reaction temperature was below 42° C. The reaction proceeded to completion more slowly than in the next preceding example, and I allowed the catalyst to remain in contact with the crude solvent naphtha for a period of 1½ hours.

I have made no melting point test upon the resin produced, but observed that the resin cracked readily at normal room temperature, indicating roughly a melting point higher than about 90° C. The resin showed precipitation from Stoddard solvent naphtha at −9° C.

It is apparent from the above examples that the isopropyl ether, also, did not so react with the sulphuric acid as seriously to impair the catalytic value of the catalytic solution.

In both the runs utilizing isopropyl ether as a solvent diluent for the sulphuric acid, the reacted mixture was diluted with three times its volume of petroleum benzine in preparation for washing and neutralization.

In all the examples given the reaction temperature was controlled by water jacketing. I have noted particularly that the control of reaction temperature may be readily effected when using as a catalyst either isopropyl ether or acetic acid.

In each of the examples given water at tap temperature was used instead of the refrigerated water commonly employed to control the temperature of a polymerizing reaction to produce resin.

In each example given, the period of reaction was relatively extended. There was no apparent substantial production of unduly high polymers, and there appeared to be no products of side reactions.

It may be explained that in testing the solubility of the resin by precipitation from Stoddard solvent naphtha, I made in each instance a 20% solution by weight of the resin in the solvent, and cooled back to the temperature at which precipitation took place.

The subject-matter herein disclosed, relating to the use of isopropyl ether as a diluent for the sulphuric acid catalyst, is disclosed and claimed in an application divisional hereof, Serial No. 29,376, filed July 1, 1935.

I claim as my invention:

1. In the process of producing resin by the catalytic polymerization of crude solvent naphtha or a like reaction liquid containing bodies polymerizable to coumarone resin, the herein described polymerization step which comprises preparing a catalytic solution by diluting sulphuric acid with glacial acetic acid a solvent for the sulphuric acid, which glacial acetic acid is in itself inert to all polymerized and unpolymerized constituents of the reaction material and which does not produce with the sulphuric acid reaction seriously impairing the catalytic value of the catalytic solution, commingling the resulting catalytic solution with the body of reaction liquid, thereby producing a complete and uniform dissemination of active catalyst throughout the body of reaction liquid effecting in the reactive liquid a polymerizing reaction produced by said catalytic solution.

2. In the process of producing resin by the catalytic polymerization of crude solvent naphtha or a like reaction liquid containing bodies polymerizable to coumarone resin, the herein described polymerization step which comprises preparing a catalytic solution by diluting sulphuric acid with a saturated monobasic aliphatic acid liquid at normal room temperature, which organic acid is in itself inert to all polymerized and unpolymerized constituents of the reaction material and which does not produce with the sulphuric acid reaction seriously impairing the catalytic value of the catalytic solution, commingling the resulting catalytic solution with the body of reaction liquid, thereby producing a complete and uniform dissemination of active catalyst throughout the body of reaction liquid and effecting in the reactive liquid a polymerizing reaction produced by said catalytic solution.

GEORGE KENNETH ANDERSON.